United States Patent [19]

Adachi et al.

[11] Patent Number: 4,940,295
[45] Date of Patent: Jul. 10, 1990

[54] BRAKE PRESSURE CONTROL DEVICE

[75] Inventors: Yoshiharu Adachi; Kazutaka Kuwana; Tsuyoshi Yoshida, all of Aichi, Japan

[73] Assignee: Aisin Seiki Kabushiki Kaisha, Aichi, Japan

[21] Appl. No.: 387,663

[22] Filed: Jul. 31, 1989

[30] Foreign Application Priority Data

Jul. 29, 1988 [JP] Japan .................. 63-190900

[51] Int. Cl.⁵ .................. B60T 8/32
[52] U.S. Cl. .................. 303/117; 303/68; 303/119
[58] Field of Search .......... 303/117, 119, 116, 113, 303/68, 69; 188/181 A, 181 R

[56] References Cited

U.S. PATENT DOCUMENTS 4,668,024 5/1987 Nakanishi et al. .................. 303/119

Primary Examiner—Douglas C. Butler
Attorney, Agent, or Firm—Sughrue, Mion, Zinn, MacPeak & Seas

[57] ABSTRACT

A brake pressure control device for use in an anti-skid control system decreases the slipping of a car wheel by reducing the car wheel brake pressure when the slipping of the car wheel against the road surface is excessive at the time of applying a brake pressure to the car wheel brake. The brake pressure control device includes a valve body having a first input port, a second input port, an output port, a spool valve with an annular recess communicating the ports, a spring biasing the spool valve toward a first position, a pressure chamber connected to the output port for applying pressure to the spool to move the spool toward a second portion and an electric coil for applying a force to move the spool toward the first position. Thus, the car wheel brake pressure can be controlled in proportion to the current supplied to the coil.

1 Claim, 11 Drawing Sheets

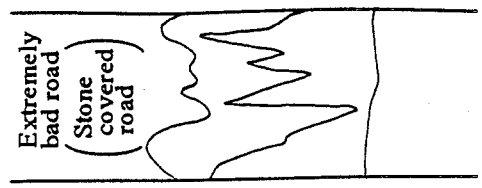
FIG. 5d — Extremely bad road (Stone covered road)
Time →
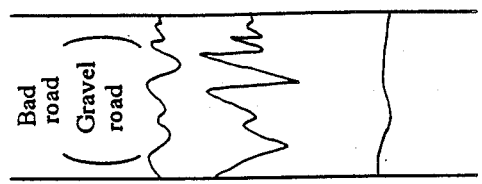
FIG. 5c — Bad road (Gravel road)
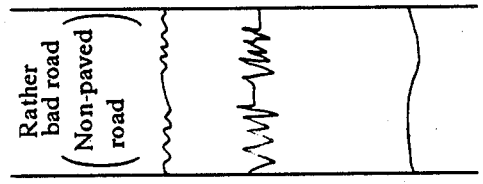
FIG. 5b — Rather bad road (Non-paved road)
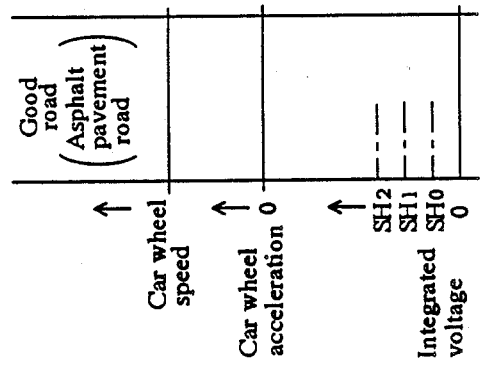
FIG. 5a — Good road (Asphalt pavement road)
Car wheel speed
Car wheel acceleration 0
SH2
SH1
Integrated SH0
voltage 0

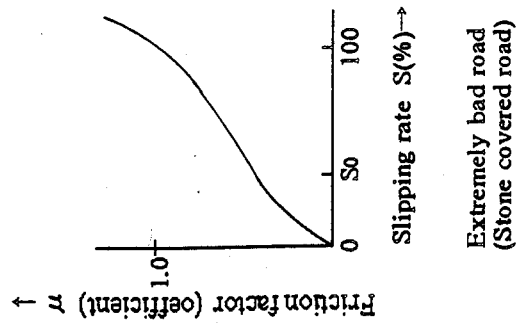
FIG. 6d — Extremely bad road (Stone covered road)
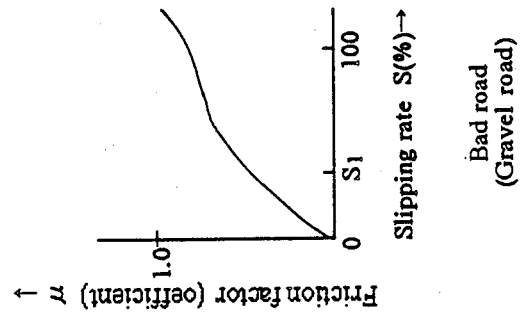
FIG. 6c — Bad road (Gravel road)
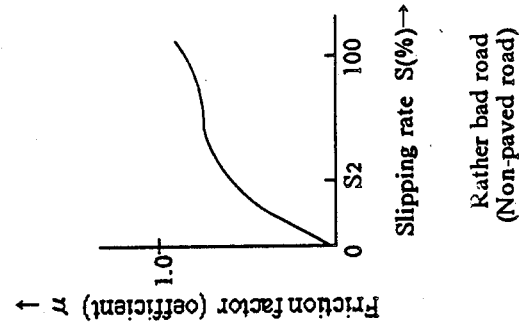
FIG. 6b — Rather bad road (Non-paved road)
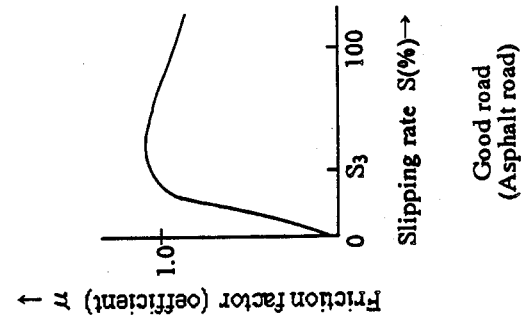
FIG. 6a — Good road (Asphalt road)

BRAKE PRESSURE CONTROL DEVICE

BACKGROUND OF THE INVENTION

The present invention relates to a device for controlling wheel cylinder brake pressure, and in particular to a brake pressure control device for use in so-called anti-skid control devices which decreases sliding of a car wheel by decreasing wheel cylinder brake pressure when sliding of the car wheel against road surface is going to be excessive when applying brake pressure to the wheel cylinder.

In a previous anti-skid control system, an electromagnetic opening/closing valve for high pressure connection to connect the car wheel brake to the brake master cylinder and an electromagnetic opening/closing valve for low pressure connection to connect the car wheel brake to a drain pressure or low pressure are utilized for car wheel brake pressure control (See Japanese Patent Publication No. Sho-51-6308 and Japanese Patent Publication No. Sho-62-125942).

When a brake pedal is stepped on and the brake pressure (high pressure) is applied to the car wheel brake from the brake master cylinder through the electromagnetic opening/closing valve for high pressure connection, the rotational speed of the wheel is decreased by the braking power of the car wheel. However, when either the road surface is icy or it is covered by some easily slidable material such as oil, the frictional factor of the car wheel against the road surface becomes very low and the car wheel slides on the road surface. Therefore, despite the car being advanced at a relatively high speed, the rotational speed of the car wheel is decreased rapidly by the braking power. For example, when the car wheel is stopped, the car wheel slides on the road surface, steering becomes impossible and the braking distance until the car is stopped from the brake pedal being stepped on becomes too long. In order to prevent this, when the slipping rate of the car wheel is calculated on the basis of the car wheel rotation speed and basic speed of the car and the car wheel is going to be locked on the basis of this slipping rate and acceleration of the rotational speed of the car wheel is desired in response to the requirement, the electromagnetic opening/closing valve for high pressure connection is closed, and the electromagnetic opening/closing valve for low pressure connection is opened so that the car wheel brake pressure is lowered. When the rotational speed of the car wheel is raised, the electromagnetic opening/closing valve for high pressure connection is opened, and the electromagnetic opening/closing valve for low pressure is closed, so that the car wheel brake pressure is raised (combination of decreasing pressure mode and increasing pressure mode). By repeating this operation, the car wheel brake pressure, i.e., the slip of the car wheel against the road surface, is controlled to be within a predetermined range and as a result, steering is improved and the braking distance is shortened.

In the above-described anti-skid control, since the car wheel brake pressure is shifted in binary, variation of the car wheel brake pressure is coarse. Therefore, it is also being carried out after the pressure is decreased and the acceleration of car wheel rotation has become high to a certain degree and has entered into a certain range, the electromagnetic opening/closing valves for high pressure connection and low pressure connection are both closed (cut off) and the car wheel brake pressure is held (holding) at a value of that time, and when the acceleration of the car wheel is further raised, the electromagnetic opening/closing valve for high pressure connection is opened (combination of decreasing mode, holding mode and increasing mode).

In order to control the car wheel brake pressure more smoothly, and to substitute two conventional electromagnetic opening/closing valves for one electromagnetic shifting valve, for example, in anti-skid control of Japanese Patent Publication No. Sho-62-270795 in a holding mode during transferring from the decreasing mode to the increasing mode, the pressure decreasing and the pressure increasing are shifted alternatively within a relatively short time period, and the duty cycle of the pressure increasing on said repeating (pressure increasing period of time+(pressure increasing period of time+pressure decreasing period of time)×100%) is gradually raised. In the anti-skid control device of said Japanese patent publication Sho-62-270795, in order to make the valve device for the brake pressure control to be more simple, an electromagnetic shifting valve is utilized, in which the valve body is driven by an electric coil, so that car wheel brake is selectively connected to either the brake master cylinder or drain pressure.

PROBLEM THAT THE INVENTION IS GOING TO SOLVE

Since the electromagnetic valve devices of both of the above-described conventional systems are the two position control valves (opening/closing or high pressure connection/low pressure connection; it may be three position control valve of high pressure connection/high-low pressure cutting off/low pressure connection), in order to apply respective brake pressures between the output pressure of the master cylinder and the drain pressure to the car wheel brake, the aforementioned duty control should be employed. Though a certain degree of smooth brake pressure can be obtained with duty control, hardware and control logic for the purpose of duty control becomes complicated, at the same time, the responsive characteristic of the electromagnetic valve becomes a problem. In case the responsive speed of the electromagnetic valve is low, or in case the linearity with respect to current value is bad, even if the duty control pulse is adjusted within a short period and finely tuned, the electromagnetic valve cannot respond to this. If the electromagnetic valve is high in linearity (output brake pressure is proportional to current value), analog power feeding control of the electromagnetic valve becomes possible, so that hardware arrangement of the anti-skid control device can be simplified.

OBJECT OF THE INVENTION

Therefore, it is an object of the present invention to provide a brake pressure control device capable of adjusting substantially linearly the brake pressure with relatively simple control means and control logic.

SUMMARY OF THE INVENTION

The brake pressure control device of the present invention is comprised of: a valve body 122 movable between a first position and a second position; a first input port 121 connected to a brake pressure source 2, 18, 18A and facing said valve body 122; a second input port 128 connected to drain pressure 20, 20A and facing said valve body 122; output space 134 arranged so that the flow area with the first input port 121 is decreased by displacement of the valve body from a first position to a second position and the flow area with second input port 128 is increased; an output port 127 in communication with said output space 134 and connected to the car wheel brake 6; returning driving means 124 for applying a driving force to move the valve body from the second position to the first position; output operating space 125 which is communicated to said output port 129 and a connection to apply the pressure of said output port 127 to said valve body 122 as a driving pressure; an electric coil 123 for effecting a driving force corresponding to an electric power value to said valve body 122; and electric power means 15, 25 for feeding an electric current to dispose said valve body in a position at a point between said first position and second position.

Since a returning driving means 124 provides a driving force in the returning direction from the second position to the first position; and output operational space 125 is communicated to the output port 127 for applying the pressure of output port 127, i.e., the car wheel brake pressure to the valve body 122 as a directional driving pressure; the electric coil 123 operates so as to effect the directional driving power of strength corresponding to the electric current value to the valve body 122; the returning driving means 124 executes an operation raising the car brake pressure, the feeding current value of the electric coil executes the operation lowering the car brake pressure, and the output operational space 125 executes the operation that when the car wheel brake pressure is raised, lowering it, and when it is lowered, raising it. That is to say, the output operational space 125 executes a resisting force against the returning force of driving means 124, as well as against the current value of the electric coil.

Here, assuming that action force of the returning driving means 124 is constant, a certain value $I_1$ of electric current is supplied to the electric coil, and the valve body 122 is positioned at a certain position $P_1$. When the current is increased from $I_1$ to $I_1+dI$, since the valve body 122 is moved in one direction, and the pressure (car wheel brake pressure) of output port 127 is lowered in response to this displacement, and also the pressure of the output operational chamber 125 is similarly changed, the force for driving the valve body 122 in said one direction becomes weakened, and the valve body 122 reaches position $P_1+dP$ (the position moved as much as dP from $P_1$ in said one direction) corresponding to $I_1+dI$. That is to say. since the valve body 122 reaches the position P corresponding to the current value I of the electric coil 124, and the car wheel brake pressure becomes lowered as much as the displacing amount in said one direction of the valve body 122 being larger, the brake pressure corresponded to (inverse proportion) the current value I of the electric coil 124 is applied to the car wheel brake 6.

When the brake master cylinder produces a brake pressure corresponding to the force applied to the brake pedal as the brake pressure source, the relation between the above-described current value I and the car wheel brake pressure becomes that as shown in FIG. 4a or FIG. 4b. FIG. 4a is the case where the force applied to the brake pedal is large (the output pressure of the master cylinder is high), and FIG. 4b is the case where the force applied to the brake pedal is small (the output pressure of the master cylinder is low).

Therefore, since the brake pressure control device of the present invention includes a current for disposing the valve body 122 at a position between the first position and the second position of the valve body 122, i.e., two positions as feeding current means 12, 25, the current flowing to the electric coil is adjusted by this, so that the car wheel brake pressure can be adjusted continuously.

Therefore, the car wheel brake pressure can be adjusted more smoothly than conventionally by a relatively simple control system and control logic as compared to a conventional system.

Further, since the relation of one to one is presented between the current value of the electric coil 123 and the car wheel brake pressure as aforementioned, the car wheel brake pressure can be recognized from the current value of the electric coil 123, and feedback control of the car wheel brake pressure is also possible.

Other objects and features of the present invention may become apparent from the following description of an embodiment with reference to the accompanying drawings.

BRIEF DESCRIPTION OF THE DRAWINGS

FIG. 1b is a longitudinal sectional view showing the construction of a first embodiment of the pressure control valve device 3 shown in FIG. 1a;

FIG. 1c is a block diagram showing the construction of the electronic control device 10 shown in FIG. 1a;

FIGS. 5a, 5b, 5c and 5d are graphs showing the relation between the car wheel speed as well as the car wheel acceleration and the condition of the road surface;

FIGS. 6a, 6b, 6c and 6d are graphs showing the relation of the slipping rate of the car wheel and the frictional factor of the car wheel against different road surfaces, respectively:

DESCRIPTION OF THE INVENTION

Figure 1A:
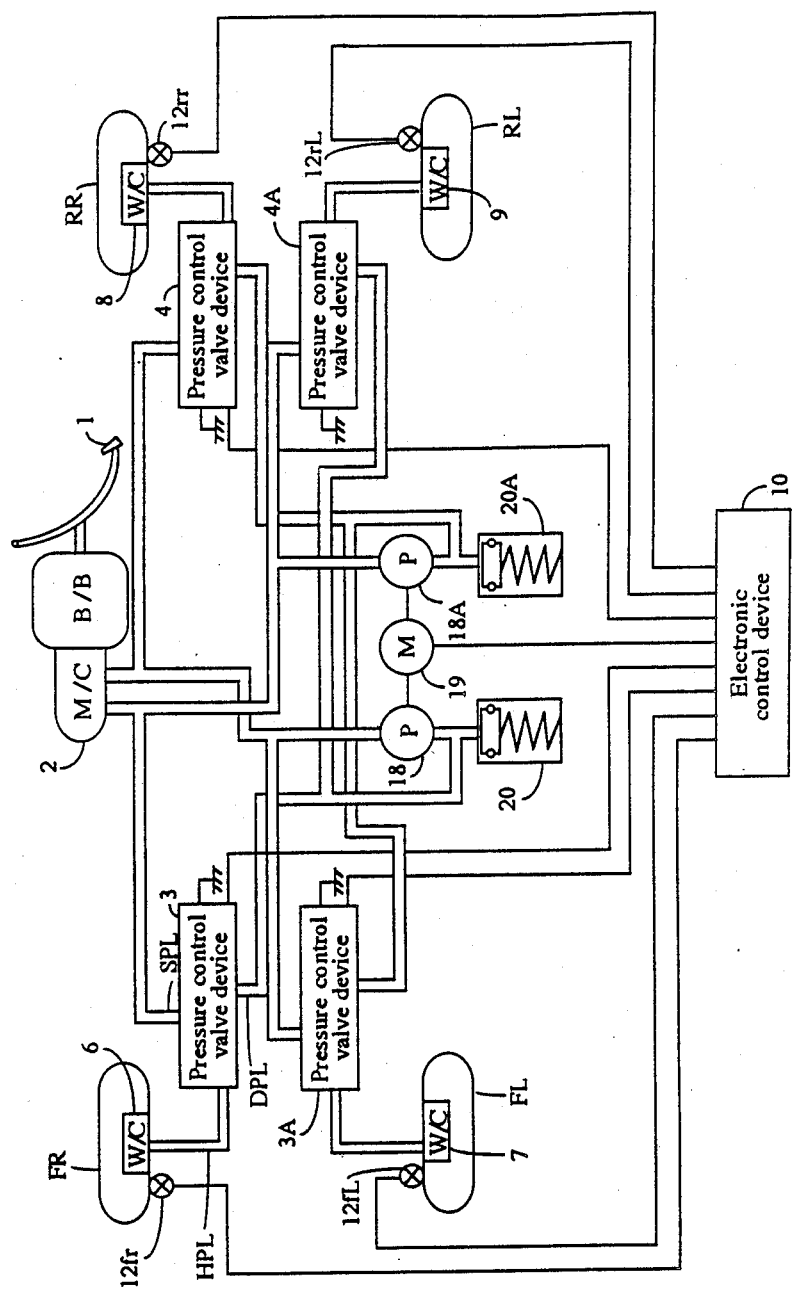
FIG. 1a is a block diagram showing an anti-skid control system in accordance with the present invention.

FIG. 1a shows an anti-skid control system equipped with a first embodiment of a brake pressure control device of the present invention.

When a driver steps on the brake pedal 1, a brake pressure corresponding to the pedal pressure is applied through the pressure control valve devices 3, 3A, 4 and 4A to the brake 6 of the front right car wheel FR, brake 7 of the front left car wheel FL, brake 8 of the rear right car wheel RR and brake 9 of the rear left car wheel RL.

The pressure control valve devices 3, 3A, 4 and 4A connect the car wheel brakes 6-9 to the brake pressure output ports of brake master cylinder 2 when an electric current is not present in the respective electric coils of the valve devices (maximum increased pressure setting).

High pressure output or discharge ports of pumps 18, 18A driven by electric motor 19 are in communication with the output ports of the master cylinder. Reservoirs 20, 20A are connected to the low pressure output or suction ports of pumps 18, 18A. The pressure control valve devices 3, 3A, 4 and 4A apply a brake pressure inversely proportional to an electric current value to the car wheel brakes 6–7 when an electric current is present in the respective electric coils. This brake pressure is determined on the basis of the electric current applied to the electric coil, output pressure of the brake master cylinder 2, discharge pressure of pumps 18, 18A and suction or drain pressure of pumps 18, 18A.

Rotational speeds of front right car wheel Fr, front left car wheel, RL, rear right car wheel RR and rear left car wheel RL are detected by speed sensors 12*fr*, 12*fl*, 12*rr*, and 12*rl*.

Brake fluid from the reservoir 20A is sucked in by pump 18A and delivered to first pressure control valve device 3 and fourth pressure control valve device 4A and the brake fluid of reservoir 20 is sucked in by pump 18 and delivered to second pressure control valve device 3A and third pressure valve device 4.

The electric motor 19, electric coils and speed sensors 12*fr*–12*rl* of the first to fourth pressure control valve devices 3, 3A, 4 and 4A are connected to the electronic control device 10.

Figure 1B:
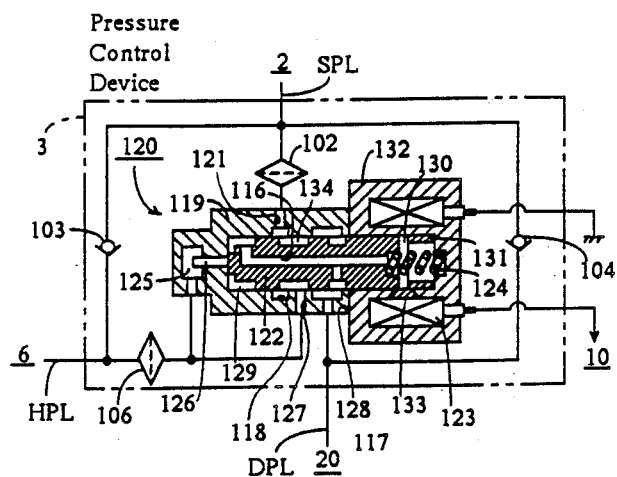

FIG. 1*b* shows the construction of the first pressure control valve device 3. The main body of the device 3 is an electromagnetic valve 120. Spool 122 of the electromagnetic valve 120 is of magnetic material and is in case member 119 and is movable to the left and right as shown in the drawing during operation. An annular groove 118 communicates with a first input port 121 extending through the case member 119 and an annular groove 117 communicates with a second input port 128 extending through the case member 119.

Ring-shaped groove 134 capable of communicating with grooves 118 and 117 is formed approximately between grooves 118 and 117 in the circumference of the magnetic material spool 122 with the groove width being equal to the distance between the grooves 118 and 117. An output port 127 is in communication with groove 134.

As shown in FIG. 1*b*, when the spool 122 is located at the left or first limit position, since a part of groove 134 overlaps a part of the groove 118, the output port 127 is communicated with the first input port 121 through these grooves. However, since the groove 134 does not overlap groove 117, second input port 128 and the output port 127 are in an isolated state and the rate of pressure increase in the car wheel brake 6 is highest. When the spool 122 is moved rightward, since the overlap of the groove 134 with the groove 118 becomes less, the rate of pressure increase becomes lower. The output port 127 and the first input port 121 become isolated from each other when groove 134 does not overlap with either of the grooves 118 and 117, and the rate of pressure increase becomes zero.

When the spool 122 is moved further rightward the groove 134 overlaps the groove 117, the output port 127 is isolated from first input port 121 and is communicated with second input port 128 and the rate of pressure decrease to the car wheel brake 6 becomes higher as the spool 122 moves rightward.

Rightward displacement of the spool 122 is limited by a stopper 131 and when the right end of the spool 122 abuts the stopper 131 the spool is in the rightward or second limit position, and the reducing pressure rate is highest at this position.

The spool 122 is pushed leftward by the compression coil spring 124. A hole is formed in the left end portion of the case member 119, and an output operational chamber 125 is formed at the left of said hole. A plunger 126 on the end of spool 122 extends into the output operational chamber 125 through said hole.

The output operational chamber 125 is communicated with the output port 127. Spring receiving space 130 to the right of the spool 122 and the plunger projecting space 129 to the left of the spool are communicated by a through hole 116 which is in communication with the second input port 128 so as not to disturb the movement of spool 122 by either the spring 124 or the electric coil 123. That is to say, because the plunger projecting space 129 is at drain pressure, the pressure of said space 129 does not disturb the rightward displacement of the spool 122 or the plunger 126. When the pressure of the output port 127 is raised, the pressure of the output operational chamber 125 is raised and pushes the plunger 126 to rightward. Accordingly, the pressure of the output port 127 operates a rightward driving force through the output operational chamber 125 and the plunger 126 to the spool 122. However, since the leftward driving power provided by spring 124 is larger even at the highest pressure predetermined for the car wheel brake pressure, the spool 122 is located at the first position shown in FIG. 1*b* regardless of the car wheel brake pressure when the electric coil 123 is not provided with electric current.

Yoke 132 is fixed at the right end of the case member 119, and the electric coil 123 is mounted in the interior of the yoke 132. A substantial center portion of the internal cylinder portion of the yoke 132 wound with electric coil 123 is cut out in a ring-shape and a non-magnetic material ring 133 is mounted therein. When electric power is fed to the electric coil 123, magnetic flux of a form of the winding of the electric coil 123 is produced but one part is broadened in the direction of the axis of the yoke 133 at the non-magnetic material ring 133 thus effecting a magnetic attractive force to drive the spool 122 rightward.

When the master cylinder 2 produces a certain brake pressure by stepping on the brake pedal 1 when electric power is not supplied to the electric coil 123, and the spool 122 is located at the first position shown in FIG. 1*b*, the brake is located at the first position shown in FIG. 1*b*, the brake fluid flows to the car wheel brake 6 by way of the filter 102, first input port 121, grooves 118–134, output port 127, filter 106, and the brake pressure of the car wheel brake 6 is raised. Since the overlapping of grooves 118 and 134 is maximum, the rate of increase of the brake pressure of car wheel brake 6 is highest.

When the brake pedal 1 is released, the brake master cylinder 2 relieves the load at the first input port 121, and the brake fluid of the car wheel brake 6 returns to the master cylinder 2 by way of filter 106, output port 127, grooves 134, 118, first input port 121, and filter 102, and even if it is passed through the check valve 103 when the difference between the brake pressure of the car wheel brake 6 and the pressure of the master cylinder 2 is over a predetermined value, the brake fluid of the car wheel brake 6 returns to the master cylinder.

When electric power is supplied to the electric coil 123 at the same time that the master cylinder 2 produces brake pressure as a result of stepping on the brake pedal 1, and the brake pressure of the car wheel brake 6 is raised over a certain degree and the braking power is supplied to the car wheel RF, the spool 122 is moved to rightward correspondingly in response to the electric current value. During this displacement, the overlapping of the groove 134 and the groove 118 is decreased, and when the pressure of the car wheel brake 6 is lowered against the output pressure of the master cylinder 2, the rate of braking of the car wheel brake 6 is dropped. The grooves 134 and 117 start to overlap after the overlapping of the grooves 118 and 134 is terminated, and drain pressure is applied to the output port 127 so that the pressure of the car wheel brake 6 starts to drop. The rate of pressure drop depends upon the magnitude of overlapping of the grooves 134 and 117. Since the force pushing the spool 122 rightward by the plunger 126 is decreased when the pressure of the output port 127 is dropped, this also drops the rightward driving force acting on the spool 122 which is the driving force by electric coil 123 plus the driving power by plunger 126, and the spool 122 is stopped at a position where the rightward driving force is balanced with the leftward driving force of the compression coil spring 124. Thus, the position corresponds to the electric current value of the electric coil 123. Therefore, the pressure of the output port 127 and car wheel brake 6 reaches a value corresponding to the electric current value of the electric coil 123. At this reduced pressure, the brake fluid flows from the car wheel brake 6 by way of the filter 106 and output port 127 to the accumulator 20.

The filter 102 prevents the penetration of dirt into the electromagnetic valve 120 which is carried by the brake fluid delivered from the master cylinder 2 to the car wheel brake 6 and the filter 106 prevents the penetration of dirt into the electromagnetic valve 120 which is carried by the brake fluid returning from the car wheel brake 6 to the master cylinder 2. The filters are provided to prevent improper operation of the electromagnetic valve 120.

A check valve 103 prevents the flow of the brake fluid from the master cylinder 2 to the car wheel brake 6 and permits the flow in the opposite direction from the car wheel brake 6 to the master cylinder 2 and is utilized for returning rapidly the brake fluid of the car wheel brake 6 to the master cylinder 2 at the time when the brake pressure of the master cylinder 2 is dropped due to brake pedal 1 being released, and for making possible the releasing of the car wheel brake pressure in a case when the electromagnetic valve 120 malfunctions.

The check valve 104 prevents the flow of the brake fluid from the master cylinder 2 to the accumulator and second input port 128 and permits the flow of the brake fluid from the accumulator 20 to the master cylinder 2 at the time of pressure reduction. In addition, if said pressure reduction is executed and the pump 18 is driven as described hereinafter, the brake fluid of the accumulator 20 is returned to the master cylinder 2 by pump 18, and therefore, the return through the check valve 104 occurs either if the brake fluid is still left in the accumulator 20 when the pump 18 is stopped or if the pump 18 malfunctions.

While the construction and operation of the first pressure control valve device 3 is explained hereinabove, the construction and operation of second third and fourth pressure control valve devices 3A, 4 and 4A are the same as the device 3.

Figure 8:
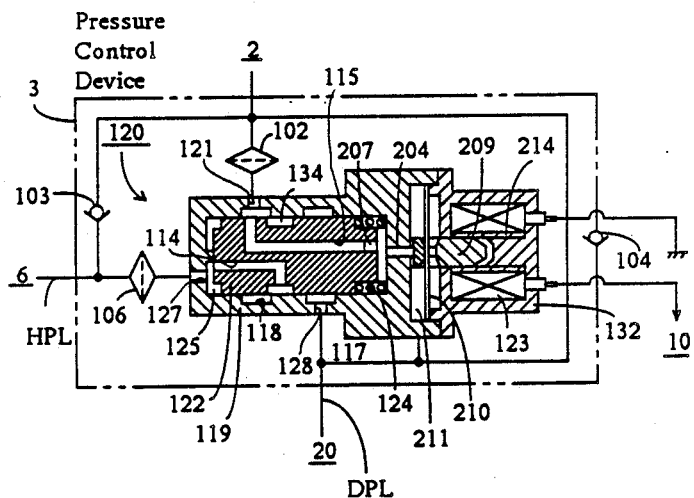
FIG. 8 is a longitudinal sectional diagram showing a second embodiment of the electromagnetic valve according to the present invention.

Another embodiment of the present invention is shown in FIG. 8 with respect to the first pressure control valve device 3. In this embodiment, the space at the left side of the spool 122 in the internal space of the case member 119 is the output operational chamber 125 and the output port 127 is communicated from the groove 134 through a passage 114 in the spool 122 to chamber 125. The compression coil spring 124 is received in the space 204 at the right side of the spool 122 and first input port 121 communicates with the space 204 through orifice 207 and through passage 115. A nozzle 208 communicates the space 204 with space 211 and the nozzle 208 is closed by the left end of the plunger 209. An elongated slot is formed in the plunger 209 and leaf spring 210 is passed through this slot. The leaf spring 210 drives the plunger 209 in a direction to close the nozzle 208. When the electric coil 123 is supplied with electric power, the plunger 209 is drawn to the right and the plunger 209 opens the nozzle 208 and the pressure of space 204 drops lower than the pressure of the input port 121. This degree of pressure drop corresponds to the position of the plunger 209 which is determined by the electric current value supplied to the electric coil 123. Then, since the pressure of the output operational chamber 125 is higher than the pressure of space 204, the spool 122 moves rightward until the force in the output operational chamber 125 driving the spool to the right becomes equal to the force exerted by the spring 124 on the spool 122. Therefore, since the force in the space 204 for driving the spool 122 to the left is determined by the electric current value of the electric coil 123, the position of the spool 122 corresponds to said electric current value.

The embodiment of FIG. 8 described above is similar to the embodiment shown in FIG. 1b and can be utilized in the anti-skid control system as valves 3, 3A, 4, 4A, as shown in FIG. 1a.

Figure 1C:
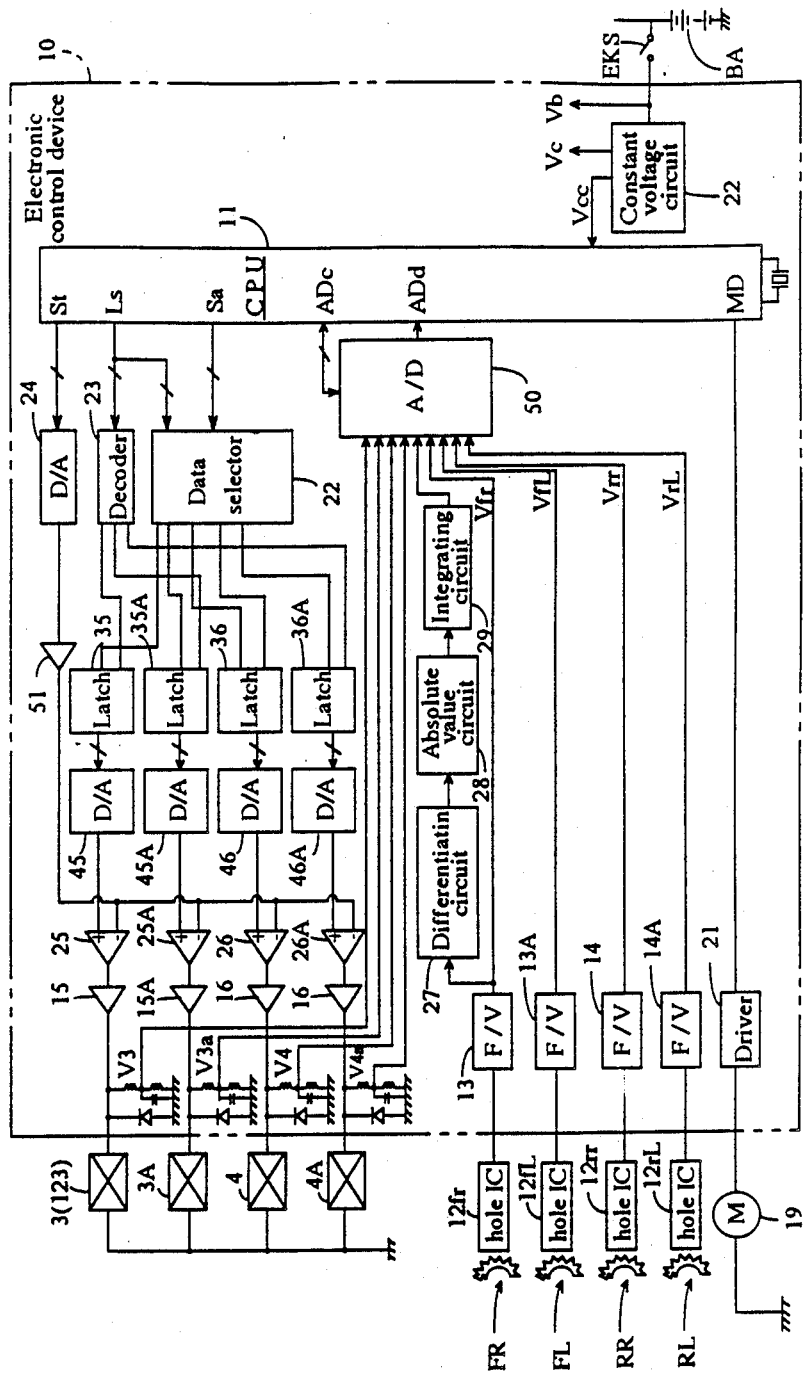

The construction of the electronic control device 10 shown in FIG. 1a is shown in detail in FIG. 1c. The speed sensors 12fr, 12fl, 12rr and 12rl produce electrical pulses at a frequency proportional to the speed of rotation of a wheel in response to the rotation of a permanent magnet ring of gear shape coupled to the car wheel or shaft. These electric pulses are applied to F/V converters 13, 13A and 14, 14A. F/V converters 13, 13A and 14, 14A produce the electric voltages having a level proportional to the frequency of the input electric signals and apply the voltages to A/D converter 50.

The motor 19 receives electric power from motor driver 21. Microprocessor 11 (hereinafter called the CPU) provides electric power instruction to the motor driver 21.

Amplifiers 15, 15A, 16 and 16A supply electric current to the coils of the first-fourth pressure control valve devices 3, 3A, 4, 4A and the output of differential amplifiers 25, 25A, 26 and 26A determine the electric current value. Signals from D/A converters 45, 45A, 46 and 46A representing the slipping rate of the car wheels RF, RL, RR, against the road surface are supplied to the normal phase input terminals of differential amplifiers 25, 25A, 26 and 26A and a signal from D/A converter 24 representing a desired slipping rate is supplied through amplifier 51 to the inverse phase input terminals.

Since the differential amplifiers 25, 25A, 26 and 26A produce a signal representing the "slipping rate of car wheel: desired slipping rate" and apply this to the amplifiers 15, 15A, 16 and 16A, the amplifiers 15, 15A, 16 and 16A supply an electric current proportional to the "slipping rate of car wheel: desired slipping rate" to the coils of the first-fourth pressure control valve devices 3, 3A, 4, 4A. However, the coils are not supplied with electric power when the current required for driving the spool 129 to the second position is made as an upper limit value and the "slipping rate of car wheel: desired slipping rate" is negative. That is to say, the amplifiers 15, 15A, 16 and 16A are positive polarity limit amplifiers.

Latches 35, 35A, 36 and 36A latch the data representing the slipping rate of the car wheels FR, FL, RR and RL received from CPU through the data selector 22 and supply this data to D/A converters 45, 45A, 46 and 46A.

Voltages $V_3$, $V_{3a}$, $V_4$ and $V_{4a}$ (feedback voltages) representing the conducted electric current value for the electric coils of the first through fourth pressure control valve devices 3, 3A, 4 and 4A correspond to the car wheel brake pressure, and represent the degree of reduced pressure. These signals are also supplied to D/A converter 50.

Further, voltage Vfr representing the rotational speed of the car wheel FR is also supplied to differentiation circuit 27 and the differentiation circuit 27 produces a signal representing its varying rate (positive: increasing speed, negative: reducing speed). Absolute value circuit 28 produces a voltage representing the absolute value (full wave rectified value) of this varying signal, and integrating circuit 29 integrates the absolute value voltage, and provides the integrated voltage to A/D converter 50.

Constant voltage circuit 22 is connected to battery BA on the car through engine key switch EKS and this constant voltage circuit 22 delivers required voltages to respective parts of the electronic control device 10.

Explaining the synopsis of anti-skid control operation of CPU 11, the CPU 11 reads out by converting the integrated voltage of integrating circuit 29 to digital data by A/D converter 50, judges the concave/convex condition, i.e., good/bad condition of the road surface on the basis of said data, sets desired slipping rate St on the basis of judging result, and outputs the data representing this to D/A converter 24.

In anti-skid control, it is preferred to change the control characteristic in response to the road surface condition. For example, when running on a road where the vibration of the car wheel becomes greater, since a relation between the slipping rate of car wheel and the frictional factor of car wheel against road surface varies, for example, as shown in FIGS. 51-5d, according to the road surface condition, it is preferred to control the car wheel brake pressure so that the slipping rate utilizes the maximum value of frictional factor $\mu$ in response to the road surface condition. In order to execute a desirable control corresponding to the road condition as above, it is required to detect the road condition. However, when the car wheel enters a hole in the road surface, rises from the hole over a bump and drops from the bump or slips for a moment on pebbles or gravel as well within the seams of a stone pavement and the like, the rotational speed is instantaneously raised or dropped, and this is repeated in an irregular period on a bad road, and when the degree of a bad road condition is highest, the amplitude of speed variations is larger, and instantaneous increases in the speed of rotation of a car wheel and reductions in speed become larger. When the rotational speed of a car wheel is raised from a regular speed and dropped to an irregular speed, positive peaks and negative peaks appear to the acceleration of that time. That is to say, since the acceleration degree produces a vibration of one period during a half period of vibration of rotational speed, the acceleration is double the frequency of vibration, and further, the amplitude of acceleration is larger when the amplitude of car wheel speed is severe, i.e., when the road surface condition is worse. Accordingly, since the integrating circuit 29 integrates this speed carrying rate, the integrated value becomes a relatively larger value with respect to the vibration of speed varying rate, not only does the judgment of good road/bad road become correct but it becomes easy to discriminate this integrated value with multiple steps. That is to say, the road surface condition can be judged as a good road for a small range of integrated values, as a rather bad road for a rather high range, as a bad road for high range, and as the worst road for the highest range. Thus, when the judgment of good road/bad road is correct, sensitivity adjustment in response to the road surface condition for anti-skid control is correct and stabilized, so that disorders of anti-skid control can be prevented. Further, when it is discriminated with multiple steps, the sensitivity of anti-skid control can be adjusted by multiple steps. In case of multiple step adjustment, since the sensitivity is possible to change gradually without being an extreme sensitivity variation as in the case of selecting one alternative of high sensitivity or low sensitivity, extreme control characteristic variations do not appear, and stability and reliability of anti-skid control is high.

In order to execute these multiple step adjustments, CPU 11, on the basis of the integrated voltage of integrating circuit 29, judges the degree of good and bad of road surface conditions by checking where it is presented in any of region classified by $0 \sim SH_2$ of FIGS. 5a-5d and the desired slipping rate St is set to $S_3 \sim S_0$ in response to this as shown in FIG. 6a-6d.

On the other hand, CPU 11 operates by converting the car wheel rotational speeds Vfr, Vfl, Vrr and Vrl to digital data in A/D converter 50, calculating the standard speed Vs to be assumed as car speed on the basis of those speeds, calculating the slipping rate Sfr of car wheel FR by:

$$Sfr = (Vs - Vfr)/Vs \times 100\%,$$

calculating also similarly the slipping rates Sfl, Srr and Srl of other car wheel FR, RR and RL, and latching the data representing these car wheel slipping rates Sfr, Sfl, Srr and Srl through data selector 22 to latches 35, 35A, 36 and 36A, respectively.

Therefore, for example, explaining with regard to said front right car wheel RF, when the differential amplifier 25 outputs a voltage proportional to Sfr−St, and this is positive (slipping of car wheel FR is larger than desired value), the amplifier 15 conducts electric current (but there is upper limit) proportional to Sfr−St to the electric coil 123 of the first pressure control valve device 3. By this electrical conduction, the pressure of output port 127 of first pressure control valve device 3 is dropped and the rotational speed of car wheel FR starts to rise, and the slipping rate Sfr drops. According to this dropping, Sfr−St is dropped and the electric current value of the electric coil 123 is dropped, and the dropping of the pressure of output port 127 becomes either less or higher, and then the brake pressure of car wheel brake 6 is raised. Thus, the car wheel brake pressure is controlled such that the slipping rate of car wheel FR reaches desired value St by feedback control. In addition, the car wheel brake pressure control of the other car wheels Fl, RR, RL is also executed similarly.

Figure 2:
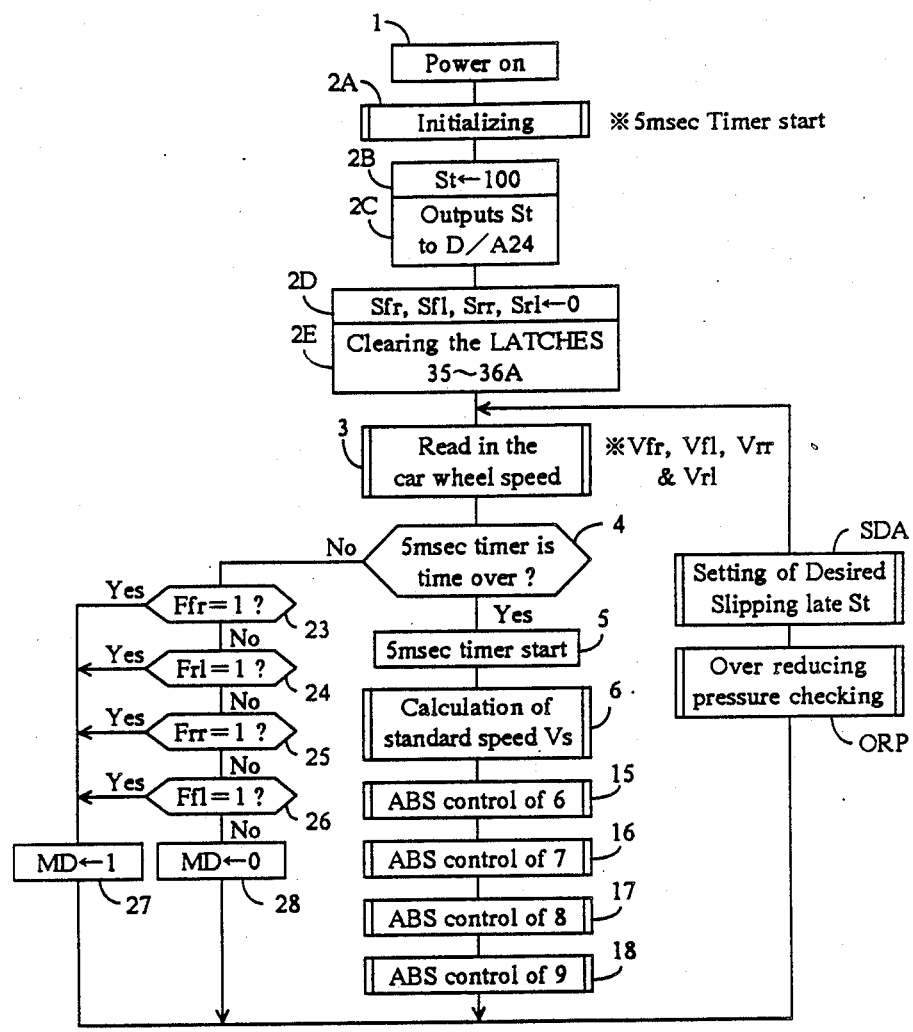
FIG. 2 is a flow chart showing a synopsis of the control operation of microprocessor 11 shown in FIG. 1c.

A synopsis of the brake pressure control operation of microprocessor 11 is shown in FIG. 2 and is as follows:

(1) Initialization (1, 2):

Microprocessor 11, when the switch EKS is closed and the constant voltage circuit 22 produces constant voltage Vcc of predetermined level, is started (step 1: hereinafter, within parenthesis, deleting the word step or subroutine and expressing only the symbol representing that step or subroutine), and clearing the internal register, counter, timer and the like; outputting (2A) "0" (pump stopped: electric motor 19 is not energized) to output port MD; outputting (2B, 2C) desired slipping rate St by setting that representing 100% to D/A converter 24; setting (2D) the data for representing the slipping rate "0" to the car wheel slipping rate registers Sfr, Sfl, Srr and Srl; and latching (2E) the data of slipping rate registers Sfr, Sfl, Srr and Srl through the data selector 22 to the latches 35, 35A, 36 and 36A. Since the contents Sfr, Sfl, Srr and Srl of the car wheel slipping rate registers Sfr, Sfl, Srr and Srl are representing "0", these have the same meaning when clear of latches 35, 35A, 36, 36A. Accordingly, the differential amplifiers 25, 25A, 26 and 26A of which respective positive phase input is 0% level, and inverse phase input is 100% level, and since the outputs of these differential amplifiers are negative, the amplifiers 15, 15A, 16, 16A do not conduct with electric power to first-fourth pressure control valve devices 3, 3A, 4 and 4A. Therefore, the electromagnetic valve 120 is at a state where the spool 122 is located at the first position (leftward limit position) shown in FIG. 1b.

(2) Reading of car wheel speed (3):

Converting the car wheel speed voltage Vfr, Vfl, Vrr and Vrl to digital data sequentially by A/D converter 50 and writing respectively in car wheel speed registers Afr, Afl, Arr and Arl.

Figure 7:
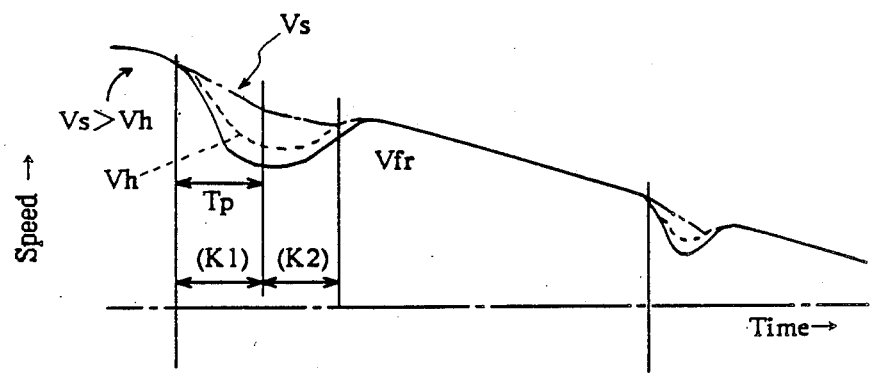
FIG. 7 is a time chart showing the standard speed Vs as calculated by the microprocessor 11 shown in FIG. 1c.

(3) Calculation of standard seed (6): (Detail is in FIG. 3a):

Taking out the highest speed of the car wheel speeds Afr, Arr and Arl, and comparing this with the written value Vs of standard speed register Vs, when it is Vh≧Vs, writing Vh by updating it to standard speed register Vs. When it has become Vh<Vs (defining the content of standard speed register Vs at this moment into Vso), starting the time counting of duration To with starting point of that time point, and when Vh<Vs continues, at each time interval reading the car wheel speed, when it is within the predetermined value Tp, updating the content of standard register Vs to Vso−K1 To, and when To exceeds the predetermined value Tp (defining the content of standard speed register Vs at that time point into Vs1), updating the content of standard speed register to Vs1−K2 (To−Tp) thereafter. When maximum value Vh of the car wheel speeds Afr, Afl, Arr and Afl exceed the content Vs of standard speed register Vs, writing Vh to standard speed register Vs. Accordingly, maximum value of speed curves (solid line: car wheel speed Vfr of front right car wheel, dotted line: maximum value Vh of car wheel speeds of 4 wheels, and one dot chain line: calculated value for reducing by predetermined reduced speed K1, K2) shown in FIG. 7 are written in the standard speed register Vs. This is the standard speed that is considered to be the car speed.

(4) Anti-skid brake pressure (ABS) control steps 15–18 (Details are in FIG. 3b):

Explaining the front right car wheel FR, in this case, calculating the slipping rate Sfr of car wheel FR by:

$$Sfr = (1 - Vfr/Vs) \times 100,$$

and comparing Sfr with desired slipping rate St, when it is Sfr≧St, writing in "1" to flag register Ffr for displaying "pressure reducing is required". When it is not, writing in "0" to Ffr for displaying "pressure reducing is not required". ABS controls with respect to other car wheels also are the same as aforementioned.

(5) Checking of over pressure reducing (ORP) (Details are in FIG. 3c):

In order to prevent the pressure reducing over an excessively long period of time (high possibility occurring in case of something abnormal), counting up the pressure reducing (Ffr=1) time, and subtracting the counting value or pressure reducing time when it changes from the pressure reducing to the pressure increasing (Ffr=0)(counting down from the counting value of the pressure reducing time). Therefore, the counting value is that obtained by subtracting the pressure increasing time from the pressure reducing time. When this counting value (remaining value) exceeds the predetermined value, that is considered as abnormal pressure reducing and the pressure reducing is stopped. When the counting value reaches "0", the force of pressure increasing is released.

(6) Setting of desired slipping rate St (SDA) (FIG. 3d):

When Vfr is substantially equal to the standard speed Vs, reading out the integrated voltage of integrating circuit 29 and converting to digital by A/D converter 50, when the integrated voltage Rds is under SHo of FIG. 5A, considering the road surface is good road and setting the desired slipping rate St to S3 (FIG. 6a), when the integrated voltage Rds is over SHo and under SH1 of FIG. 5a, considering the road surface is a rather bad road and setting the desired slipping rate St to S2 (FIG. 6b), when the integrated voltage Rds is over SH1 and under SH2 of FIG. 5a, considering the road surface is a bad road and setting the desired slipping rate St to S1 (FIG. 6c), and when the integrated voltage Rds is over SH2 of FIG. 5a, considering the road surface is the worst road and setting the desired slipping rate St to So (FIG. 6d).

When Vfr is not substantially equal to standard speed Vs, there is the possibility that the car wheel speed will vary according to the anti-skid control and the like, and since it may be presented that the car wheel speed vibration does not correspond to a good or bad road surface, the desired slipping rate St is not updated (leave the value set before as it is).

(7) Pump control (23–28):

In pump control, when "1" is written to at least one of flat registers Ffr, Ffl, Frr and Frl, outputting (latching) "1" for instructing the energizing of the motor 19, when the content of all of the flag registers Ffr, Ffl, Frr and Frl are "0", outputting "0" for instructing the stopping of the motor 19 to the output port MD. Accordingly, the motor 19 is energized during ABS control (pressure reducing) which is executed with respect to at least one car wheel, and pumps 18, 18A are being driven.

Figure 3A:
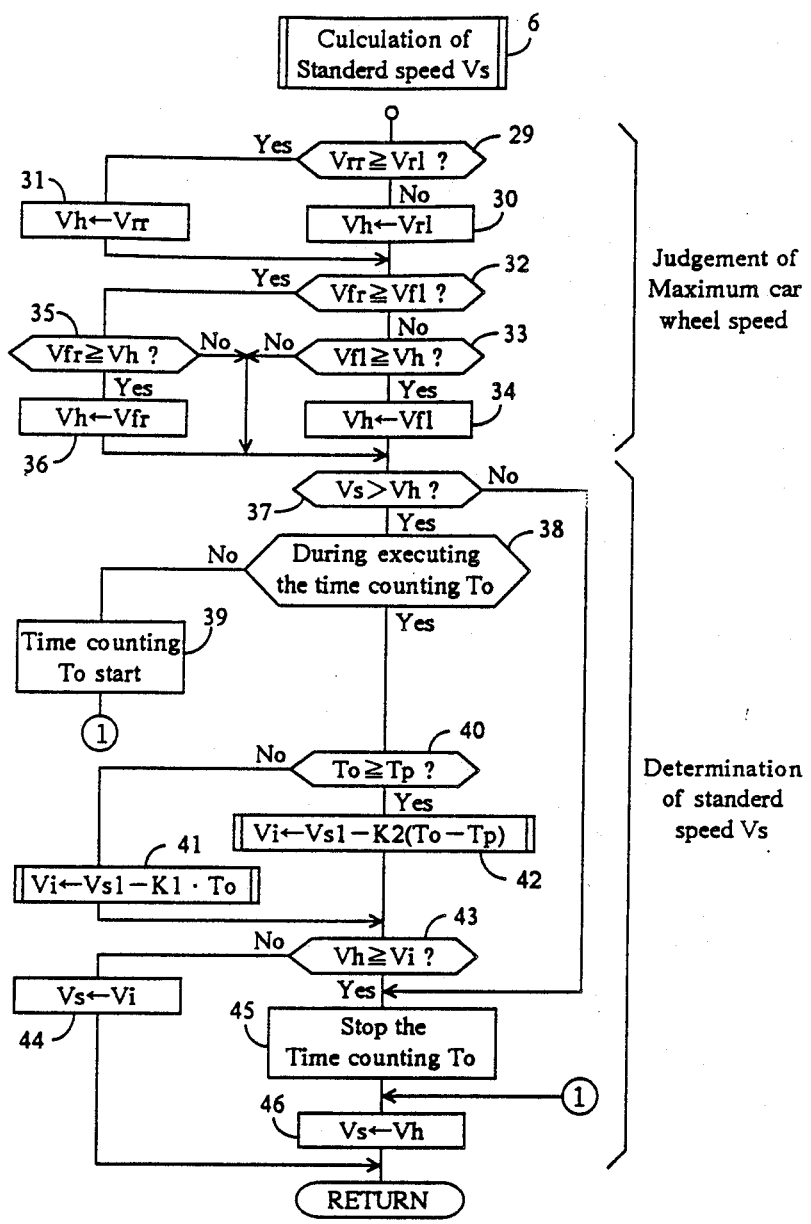
FIGS. 3a, 3b, 3c and 3d are flow charts showing details of the control operation of microprocessor 11 shown in FIG. 1c.

Next, the calculation of the aforementioned standard speed will be described in detail with reference to FIG. 3a.

This calculation 6 of standard speed Vs is executed by means of the 5m sec timer treating process of steps 4 and 5 (FIG. 2), in which it is executed by a 5m sec period of time. When advancing to the calculation 6 of standard speed, CPU 11 compares at first the car wheel speeds Vfr and Vfl of front wheel and writing the high side to the register (29-31). Next, comparing the car wheel speeds Vrr and Vrl of rear wheels, selecting the high side, comparing this wish the value of the register Vh, and writing the high side to the register Vh (32-36). Accordingly, it would happen that the highest speed is written among the car wheel speeds read out at this time. The, CPU 11 compares the content Vs of standard speed register Vs and the content Vh of the register Vh, and when it is Vh≧Vs, writing Vh to the register Vs (37, 46).

When it becomes Vh<Vs, writing Vs to register Vso and starting (38, 39) the counting of time To, while continuing the counting of time To, judging whether or not the counting value of time To has become the predetermined value Tp, when To is under Tp, calculating $Vi = Vso - K1$ To and writing it to the register Vi, and comparing Vi with Vh, when it is Vi>Vh, writing (40 - 41 - 43 - 44) Vi to the standard speed register Vs. When To becomes Tp, writing Vs to register Vs1, thereafter, calculating $Vi = Vs1 - K2$ (To Tp) and writing to the register Vi, comparing Vi with Vh, when it is Vi>Vh, writing Vi to the standard speed register Vs (40 - 42 - 43 - 44). In either case, when it happens that Vi≧Vh, the counting of time To is stopped, and Vh is written to the standard speed register (43 - 45 - 46).

Thus, the written value of standard speed register Vs is the value of largest as between the car wheel speed maximum value Vh shown by dotted line in FIG. 7 and the calculated value by subtracting with predetermined reduced speed K1, K2 shown by one dot-chain line. K1, K2 correspond to the upper limiting value of safety of reduced speed in the case of speed reducing without producing locking of the car wheel.

Figure 3B:
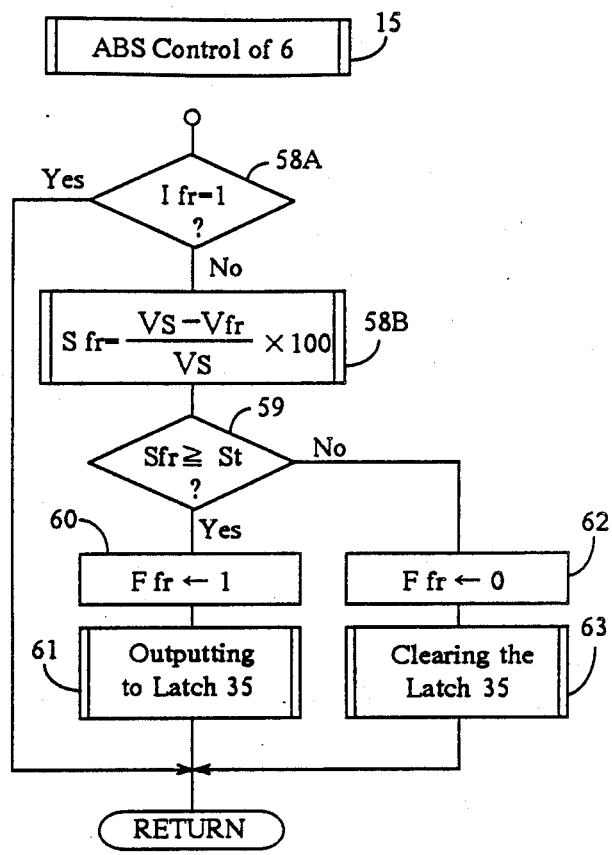

Next, the detailed content of ASB control (15) of the brake 6 of the front right car wheel FR will be described with reference to FIG. 3b. This ABS control (15) also is executed by 5m sec period.

When advancing to ABS control (15), CPU 11 checks (28A) at first the content of the flag register Ifr, and when it is "0" (it is not over long period pressure reducing), calculating (58B) the slipping rate Sfr, comparing (59) the slipping rate Sfr with desired slipping rate St, when it is Sfr≧St, since the slipping of car wheel FR is excessively larger, writing (60) "1" for instructing the pressure reducing to the flag register Ffr, and outputting Sfr to the latch 35 (updating of feedback data). When Sfr<St at step 59, since the requirement of pressure reducing is not presented, clearing (62) the flat register Ffr and clearing (63) the latch 35 (writing "Q" to the latch is same).

Further, the content of "ABS control of 7" (16), "ABS control of 8" (17) and "ABS control of 9" (18) are also the same as the content of the aforementioned "ABS control of 6" (15).

Figure 3C:
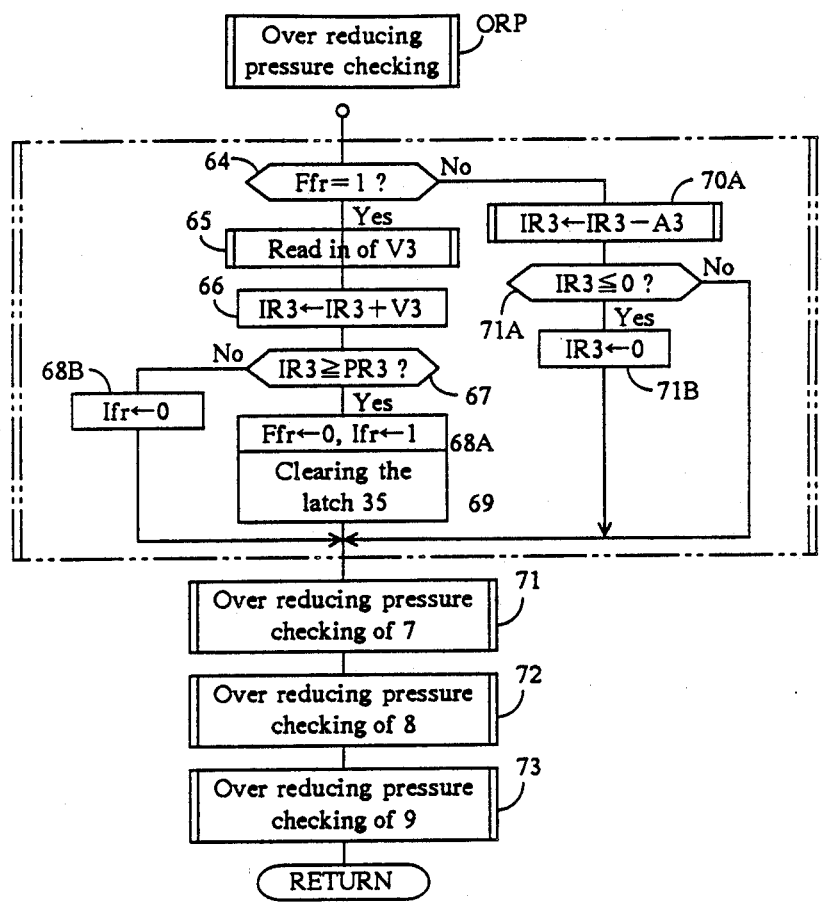

Next, explaining the content of "over reducing pressure checking" (ORP) in detail with reference to FIG. 3c, here at first, "over reducing pressure checking of 6" (70) is executed. In this "over reducing pressure checking of 6" (70), firstly checking (64) the content of the flag register Ffr, when it is "1" (during pressure reducing), reading (65) the voltage for representing the brake pressure (the electric current value of the electric coil 123 of first pressure control valve device 3: corresponds to the degree of reducing pressure) of the car wheel brake 6 by converting to digital with A/D converter 50, adding said data V3 to the content IR3 of the register IR3, and writing by updating the data IR3+V3 for representing the added value to the register IR3. And then, comparing (67) the content IR3 of the register IR3 with setting value PR3 for the over long period judgment.

In the case when IR3≧PR3, since the reducing pressure (productive value of its degree×time) is exceeded, clearing the flag register Ffr and writing (68A) "1" (reducing pressure is excessive: over long period) to the flag register Ifr, and clearing (writing the slipping rate 0) (69) the latch 35. Accordingly, the electromagnetic value 120 returns to a first position setting shown in FIG. 1b. When IR3<PR3 at step (67), clearing (68B) the flag register Ifr. When the content of the flag register Ffr is "0" "increasing pressure" (state shown in FIG. 1b) by the checking of aforementioned step 64, subtracting the constant A3 from the content IR3 of the register IR3, writing (70A) by updating the data IR3−A3 for representing the remaining value to the register IR3, when the remaining value is less than "0", updating (71A, 72A) the content of the register IR3 to "0". According to the above treatment, and when the content of the register Ifr is "1", since the electromagnetic valve 120 is forced (68A, 69) to the increasing pressure (FIG. 1b), when reducing pressure (product value of its degree×time)−increasing pressure (product value of A3×time) become excessive, the electromagnetic valve 120 is forced to "increasing pressure" (FIG. 1b) until it becomes "0".

When the above-described "over reducing pressure checking of 6" (70) is taken out, "over reducing pressure checking of 7" (71), "over reducing pressure checking of 8" (72), and "over reducing pressure checking of 9" (73) are executed in this sequence. These contents are the same as the content of "over reducing pressure checking of 6" (70).

Figure 3D:
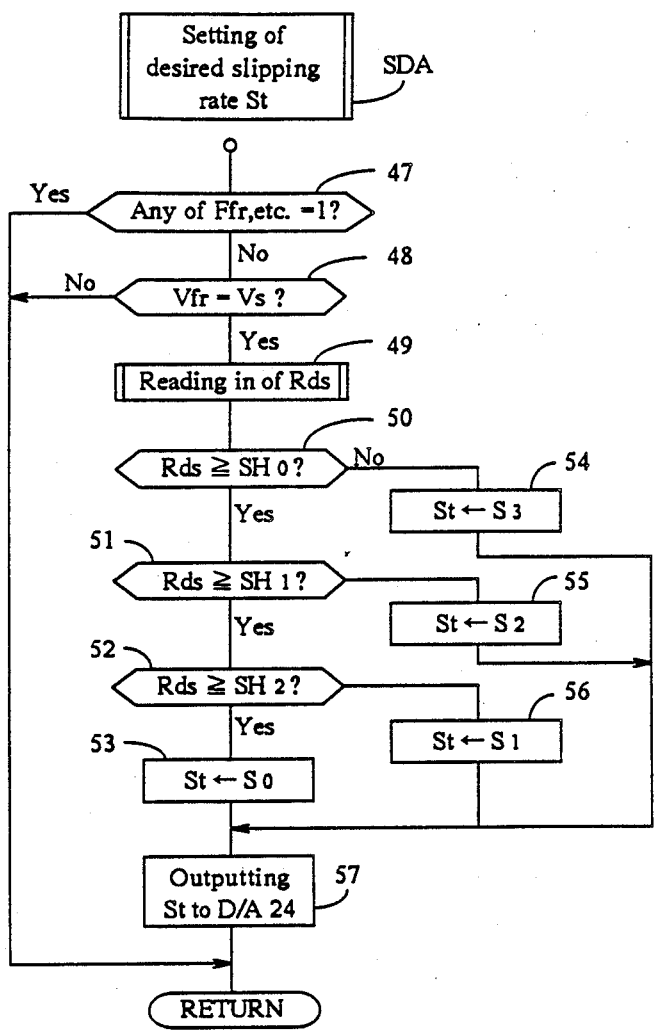
Figure 4A:
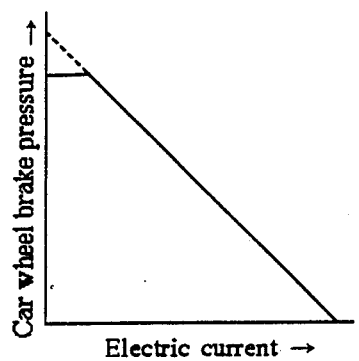
FIGS. 4a and 4b are graphs showing a relation between the electric current of electromagnetic valve 120 and the pressure of car wheel brake 6 connected to the electromagnetic valve 120 shown in FIG. 1b.
Figure 4B:
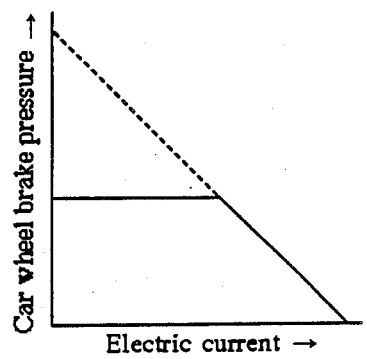

Next, the content of "setting of desired slipping rate St" (SDA) will be described in detail with respect to FIG. 3d. At first checking (47) the content of the flag registers Ffr, Ffl, Frr and Frl, when any is "1" (during the reducing pressure), since there is the possibility that the car wheel rotational speed is vibrating by anti-skid brake pressure control, there is a possibility that the detection of the road surface condition based on the car wheel rotational speed is in "error", and therefore, at this moment, the road surface condition detecting and the updating of desired slipping rate are not executed.

When the content of the flag registers Ffr, Ffl, Frr and Frl are all "0", checking (48) whether or not the difference between the car wheel rotational speed Vfr and the standard speed Vs is within a predetermined range (both are substantially equal), when it is "no", the road surface condition detecting and the updating of desired slipping rate are not executed. When it is "yes", reading (48) by converting the integrated voltage Rds of the integrating circuit 29 into digital by A/D converter 50, checking 50-52 what this is presented within any range, and setting (54-56: also refer to FIGS. 5a-5d and 6a-6d) the desired slipping rate St corresponding to said range.

A summary of the features of the control operation of the anti-skid control system shown in FIG. 1a described above, is as follows:

(1) CPU 11 generally executes the calculation of standard speed, calculation of the car wheel slipping rate and calculation of desired slipping rate, and outputs the car wheel slipping rate and the desired slipping rate. The control of the car wheel brake pressure corresponding to the car wheel slipping rate and the desired slipping rate are automatically carried out by the differential amplifiers 25, 25A, 26, 26A, amplifiers 15, 15A, 16, 16A and first-fourth pressure control valve devices.

That is to say, CPU 11 executes the detection of a so-called input parameter and a feedback parameter, and the control corresponding to these is carried out by said differential amplifiers and the like.

(2) Since said differential amplifiers and the like, when the car wheel slipping rate is larger than the desired slipping rate, having supplied the electric current corresponding to the difference between both to the electromagnetic valve 120, when the difference between both is large, "reducing pressure" is rapid. That is to say, the recovery of the car wheel rotation is rapid. When the difference between both is small, "reducing pressure" is slow and the dropping of the braking power is slow. Thus, in response to the manner of slipping rate of car wheel, the degree for preventing excessive slipping of car wheel and operating the braking power to car wheel most effectively, and the reducing control of speed are realized. Since the electric current value is an analog adjustment based on the output of the differential amplifier, the brake pressure control adjustment can be executed smoothly.

(3) Changing or adjusting of the desired slipping rate is easy, and the brake pressure control characteristic can be changed by this. That is to say, changing or adjusting of the brake pressure control characteristic is easy. Furthermore, said differential amplifiers and the like can execute appropriately the brake pressure control corresponding thereto.

(4) Observation of "reducing pressure" (car wheel brake pressure: degree of the reducing pressure) based on the electric current value of the electromagnetic valve 120 is possible, and abnormal continuation of excessive pressure reducing or reducing pressure according to any abnormality resulting from the electric circuit or the electromagnetic valve 120 of the car operation or the differential amplifiers and the like are detected, and safety treating in response to this can be carried out.

EFFECT OF THE INVENTION

As described above, in a brake pressure control device of the present invention, since the returning driving means (124) gives the driving power in the returning direction from the second position to the first position of the valve body 122, while the output operational space 125 communicates with the output port 127 and applies the pressure of the output port 127 and the electric coil 123 operates so as to effect a driving force of strength corresponding to the electric current value supplied to the coil of valve body 122; the returning driving means 124 operates to raise the car wheel brake pressure through the valve body 122, the conducting electric current value of the electric coil does the operation for dropping the car wheel brake pressure, and the output operational space 125 does the operation for dropping the car wheel brake pressure when it is raised and for raising it when it is dropped. That is to say, the output operational space 125 does the operation for resisting against the operation of the returning driving means 124 and against the electric current value of the electric coil. Since when the electric current is increased the valve body 122 is moved to the right and the pressure (car wheel brake pressure) of the output port 127 is dropped in response to this displacement, and the pressure of the output operational chamber 125 is changed similarly; the power for driving the valve body 122 to the right becomes weakened, so that the valve body 122 is moved to the right as viewed in FIG. 1b. That is to say, since the valve body 122 reaches the position corresponding to the electric current value of the electric coil 123 and the car wheel brake pressure drops as much as the movement of the valve body 122 increases, the brake pressure corresponds inversely to the electric current of the electric coil 123 which is applied to the car wheel brake 6. Therefore, since the brake pressure control device of the present invention is provided with an electric coil 123 having electric current conducting means for disposing the valve body 122 in a position between the first position and the second position. i.e., two end positions of the valve body 122; the car wheel brake pressure can be continuously adjusted by adjusting the electric current supplied to the electric coil.

Therefore, the car wheel brake pressure can be adjusted more smoothly than conventionally by the relatively simple control system and the control logic of the present invention.

It will be appreciated that the present invention is not restricted to the particular embodiments that have been described hereinbefore, and that variations and modifications may be made therein without departing from the spirit and scope of the invention as defined in the appended claims and equivalents thereof.

What is claimed is:

1. A brake pressure control device comprising:
    a valve body having a valve spool capable of moving between a first position and second position:
    a first input port which is connected to a brake pressure source and to said valve body;
    a second input port which is connected to an accumulator and to said valve body;
    an output port connecting said valve body to a car wheel brake;
    an output chamber in said spool for reducing the flow from said first input port to said output port and increasing the flow from said second input port to said output port in accordance with displacement of said spool from said first position to said second position in said valve body:
    return driving means for imparting a driving force in a return direction from said second position to said first position in said valve spool;
    an output operational space connected to said output port for applying pressure at said output port to said valve spool to move said spool toward mid second portion;
    an electric coil for providing a magnetic driving force to said spool against said driving force of said return driving means of a strength corresponding to an electric current value applied to said coil; and
    electric current conducting means for conducting an electric current to said coil for moving said valve body to a point between said first position and said second position.

* * * * *